United States Patent [19]

Lopiccolo

[11] Patent Number: 4,536,968
[45] Date of Patent: Aug. 27, 1985

[54] ADJUSTABLE WATER LEVEL DEVICE

[76] Inventor: Jerome J. Lopiccolo, 90 Fischer Ave., Islip Terrace, N.Y. 11752

[21] Appl. No.: 620,693

[22] Filed: Jun. 14, 1984

[51] Int. Cl.³ .............................................. G01C 5/04
[52] U.S. Cl. ...................................................... 33/367
[58] Field of Search ................................. 33/367, 377

[56] References Cited

U.S. PATENT DOCUMENTS

| 1,605,698 | 11/1926 | Bliss | 33/367 |
| 2,587,998 | 3/1952 | Heath | 33/367 |
| 2,664,645 | 1/1954 | Qualman | 33/367 |
| 2,814,127 | 11/1957 | Blatchford | 33/367 |

FOREIGN PATENT DOCUMENTS

| 998620 | 9/1951 | France | 33/367 |
| 1183702 | 2/1959 | France | 33/367 |
| 258345 | 4/1949 | Switzerland | 33/367 |

Primary Examiner—Harry N. Haroian
Attorney, Agent, or Firm—Richard L. Miller

[57] ABSTRACT

An adjustable water level device which may be used to match an unknown level to a reference level. The reference level may be easily adjusted by sliding a transparent cylinder inside an outer foam lined cylinder. An additional biasing spring is provided to assure safe movement of the transparent cylinder. The adjustable water level device may be attached to a vertical surface by driving nails or screws through openings in a supporting bracket or may be attached using hook and loop pile fastener type material. An offset bracket is provided so that the adjustable water level device may be mounted in the presence of obstacles such as wall moldings.

4 Claims, 2 Drawing Figures

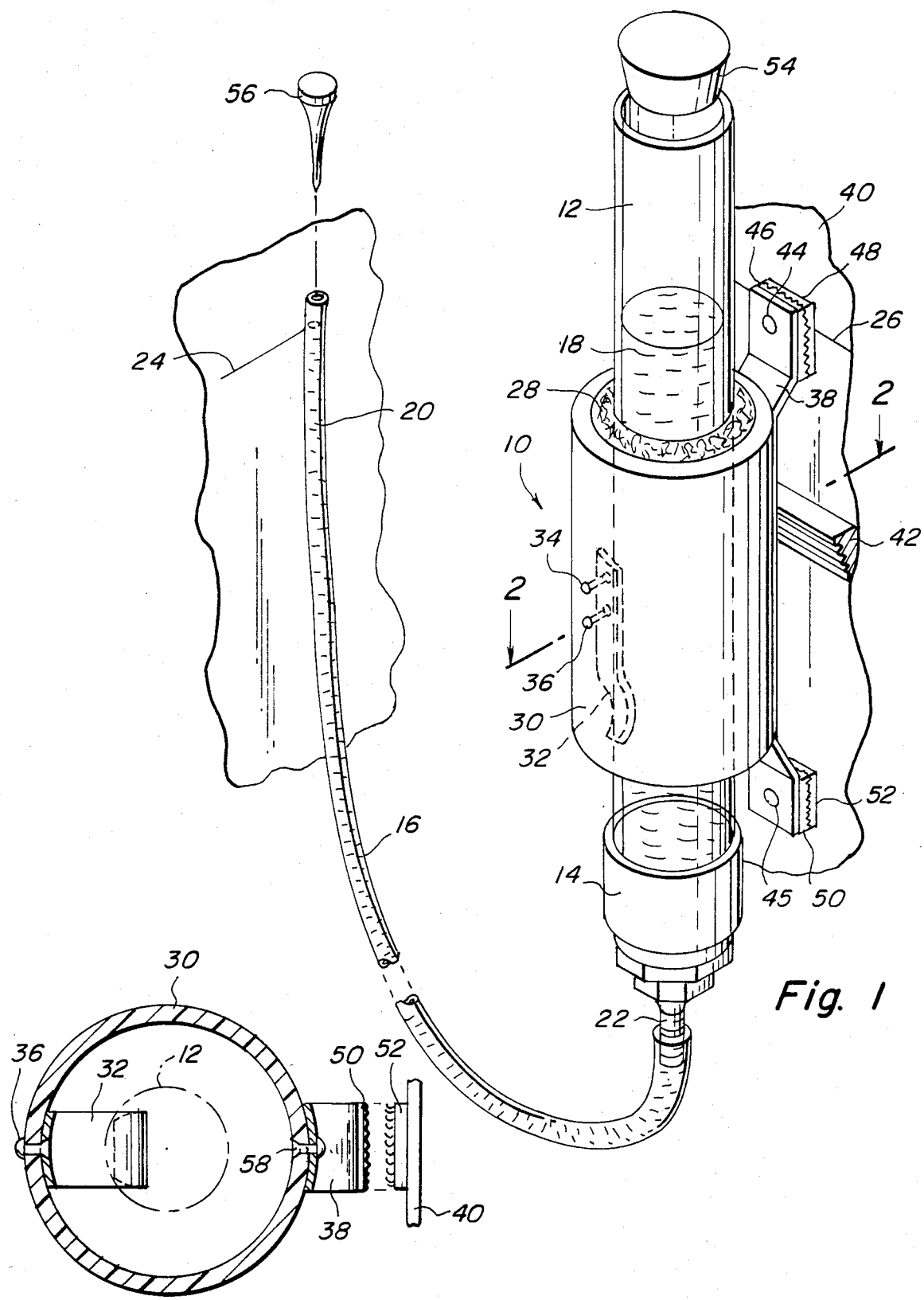

ADJUSTABLE WATER LEVEL DEVICE

BACKGROUND OF THE INVENTION

The present invention relates generally to measuring devices and, more specifically, to devices used to transfer levels from one location to a remote location such as may be required in the construction trades.

At the present state of the art a number of level transferring systems are available. For example, lasers may be placed in the center of a room, levelled and the output beam rotated in a circle thereby forming a uniform level light indicator. However, this technique is expensive and if there is an opaque obstruction between the laser and the surface to be levelled the laser becomes useless.

The fact that the level of liquid will be the same at both ends of a "U" shaped container with two open ends has been used by a number of people to deal with this dilemma. G. Blatchford, U.S. Pat. No. 2,814,127 provided a level indicating device utilizing this principle, however, both ends had to be clamped to vertical uprights in order to operate, and uprights are not frequently available. Also, the technique for adjusting the height of the reference column required the use of a complex screw arrangement. F. C. Waldo, U.S. Pat. No. 2,566,102 provided a hydrostatic level, a similar arrangement, which depended on a staff which had to be inserted into the ground. Similarly, M. R. Heath, U.S. Pat. 2,587,998 provided a similar device in which the reference column was a box like arrangement which had to be placed upon a flat surface. The likelihood of finding a flat surface at exactly the desired height is very small.

SUMMARY OF THE INVENTION

It is, therefore, a primary object of the present invention to provide an adjustable water level device which is simple to fabricate, rugged and easy to use.

A further object is to provide an adjustable water level device which can be attached to a vertical surface by use of screws or nails.

A further object is to provide an adjustable water level device which can be attached to a vertical surface by use of hook and loop pile type fastener material.

A further object is to provide an adjustable water level device in which the level of the reference column may be varied by sliding the reference column up and down inside an intermediate resilient foam cylinder.

A further object is to provide an adjustable water level device in which additional biasing for the sliding reference column is provided by a pressure clip.

A further object is to provide an adjustable water level device which can be attached to a vertical surface which contains obstructions such as wall moldings.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention in use with parts broken away.

FIG. 2 is a cross sectional view of the holder taken along line 2—2 in FIG. 1 with the foam insert omitted for clarity.

DETAILED DESCRIPTION OF THE PREFERRED EMBODIMENTS

The invention 10 consists of three primary components: a transparent cylinder 12, an adapter fitting 14 and a piece of tubing 16. Water 18 in transparent cylinder 12 is contiguous with water 20 in tubing 16 via adapter fitting 14 with associated nipple 22. Due to atmospheric pressure and gravitational forces, the water level of 20 will always equal the water level of 18, therefore the level of line 24 will be equal to the level of line 26.

The height of the reference transparent cylinder 12 is adjusted by sliding transparent cylinder 12 inside intermediate resilient foam cylinder 28 which is fixed inside outer retaining cylinder 30. Since intermediate resilient foam cylinder 28 tends to become compressed with age and use, in order to prevent the transparent cylinder 12 from slipping, additional biasing pressure is supplied by pressure clip 32 which is riveted to outer retaining cylinder 30 by rivets 34 and 36.

There are a number of ways of attaching the invention 10 to a vertical surface. A standoff bracket 38 is riveted to outer retaining cylinder by typical rivet 58. Standoff bracket 38 is provided with an offset to permit mounting the invention to a wall such as 40 even if it has molding such as 42. Standoff bracket 38 may be mounted to a wall by driving screws or nuts through apertures 44 and 45. Alternatively, mating strips of hook and loop pile type fastener material 46, 48, 50 and 52 are provided.

In order to allow transport of the invention 10 two stoppers 54 and 56 are provided so that liquid does not escape.

In operative use when it is desired to establish a level set of marks, a first reference mark such as 26, is placed at a desired height. The transparent cylinder 12 is than adjusted so that the liquid level is even with mark 26. If this is correctly done with the stoppers removed the liquid level in tube 20 will be exactly at the same level as the liquid in cylinder 12, and a second mark can be alined with this level.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An adjustable water level device, comprising in combination:
    (a) a transparent cylinder filled with a liquid whose upper surface is exposed to the atmosphere;
    (b) an adapter fitting located at the bottom of said transparent cylinder wherein the downward force of water pressure may be transferred through a nipple located at the bottom end of said adapter fitting and thereon to liquid contained in a piece of tubing attached to said nipple whereby the level of water in said transparent cylinder is equal to the level of water in said piece of tubing as long as said tubing forms a "U" and as long as the level of the end of said tubing is such that water does not flow out of said tubing;

(c) means for attaching said adjustable water level device to a vertical surface such as a wall; and, (d) means for adjusting said height of said water in said transparent cylinder, wherein said means for adjusting said height of said water in said transparent cylinder comprising an outer retaining cylinder encircling said transparent cylinder and permanently attached to said means for attaching and wherein the inner surface of said outer retaining cylinder is provided with an intermediate cylinder of resilient foam which acts as a friction clutch allowing the vertical movement of said transparent cylinder yet holding said transparent cylinder securely once set.

2. An adjustable water level device, as recited in claim 1, wherein said means for attaching said adjustable water level device to a vertical surface such as a wall comprises a bracket whose surfaces which are parallel to said vertical surface are covered with hook and loop pile type fastener material and a mating strip of hook and loop pile type fastener material which is secured to said vertical surface by a pressure sensitive adhesive.

3. An adjustable water level device, as recited in claim 1, further comprising a bracket with standoff wherein said adjustable water level device may be mounted to a vertical surface even in the presence of wall moldings and other obstructions.

4. An adjustable water level device, as recited in claim 1, further comprising a pressure clip mounted by rivets to the inner surface of said outer retaining cylinder to provide an additional biasing force should said intermediate foam cylinder become permanently compressed due to use or environmental stress.

* * * * *